Dec. 24, 1929.  A. M. GRIFFIN  1,740,732
MUD FLUME
Filed April 18, 1927
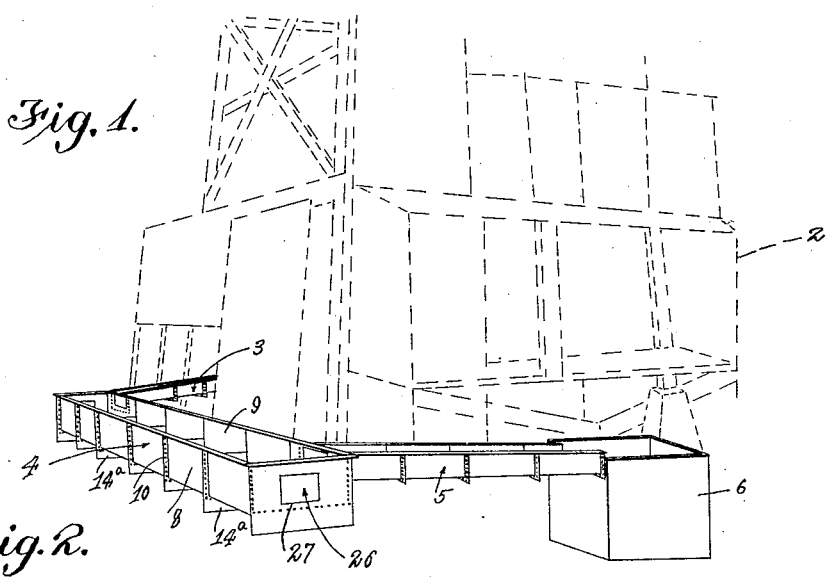
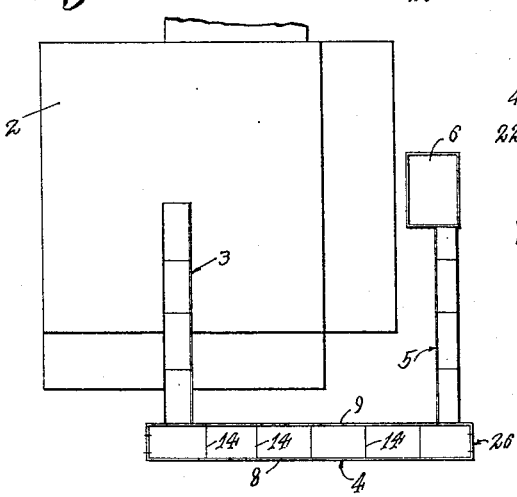
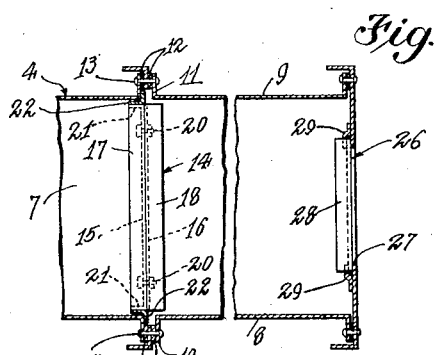
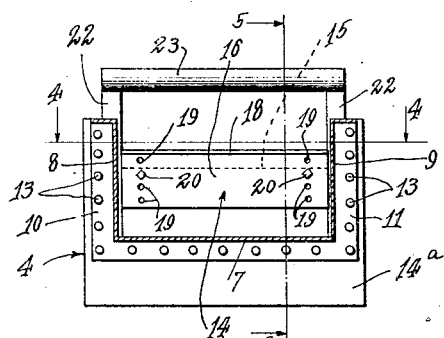
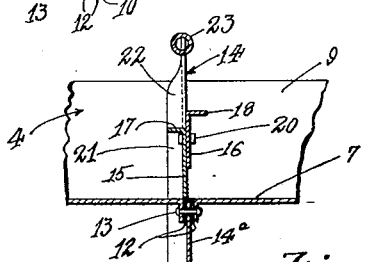
Inventor
Alvah M. Griffin
By Lyon & Lyon
Attorneys Patented Dec. 24, 1929

1,740,732

UNITED STATES PATENT OFFICE

ALVAH M. GRIFFIN, OF LOS ANGELES, CALIFORNIA, ASSIGNOR, BY MESNE ASSIGNMENTS, TO CONSOLIDATED STEEL CORPORATION, OF LOS ANGELES, CALIFORNIA, A CORPORATION OF CALIFORNIA

MUD FLUME

Application filed April 18, 1927. Serial No. 184,608.

This invention relates to a mud flume or apparatus for separating hydraulic mud from sand or detritus picked up by the mud in the hydraulic method of drilling oil wells.

In the hydraulic method of drilling wells, such as oil wells, a flushing fluid is continually forced down the well to pick up and elevate the cuttings and sand to the top of the well. This flushing fluid is composed of water and a colloidal mud which increases the weight of water and its ability to carry detritus, such as sand. At the top of the well, it is desirable to separate from this flushing fluid the detritus so that it may be reused in the drilling operations.

An object of the present invention is to provide an apparatus of especially efficient construction for separating the sand or other detritus from such mud fluid.

More specifically, the object of the present invention is to provide a mud flume with a plurality of sand collection pockets formed by baffles in the flume, which pockets may be adjusted in order to most efficiently separate the sand or detritus from the flushing fluid.

Another object of the present invention is to provide a mud flume with readily adjustable baffles for regulating the sides of the mud collection pockets of the flume.

Various further objects and advantages of the invention will be apparent from a description of a preferred form or example of a mud flume embodying the invention. For this purpose, reference is made to the accompanying drawings in which a preferred form of mud flume is illustrated.

In the drawings:

Figure 1 is a perspective view of the mud flume as it is connected with a well drilling derrick, Figure 2 is a diagrammatic plan view of the mud flume showing its association with the derrick, Figure 3 is a section of the mud flume, Figure 4 is a fragmentary horizontal section on the line 4—4 of Figure 3, and, Figure 5 is a fragmentary vertical section on the line 5—5 of Figure 3.

Referring to the drawings, the apparatus therein illustrated is shown as connected to a well derrick 2 and is illustrated as comprising a conduit 3 for conveying the flushing fluid discharged from the well to a separating passage or conduit 4, from which it is discharged through the conduit 5 to a basin or other suitable holder 6 for the cleaned mud fluid. From the holder 6, the mud fluid may be again picked up and further used in the drilling operations.

Any suitable form of conduits 3 and 5 leading to and from the flume portion or separator of the apparatus may be provided. Also the holder 6 for the purified mud fluid may be of any desired design or construction. The flume portion 4 is indicated as formed with a horizontal bottom 7 connected with side plates 8 and 9 formed in sections. Each section of the side plates 8 and 9 is provided with out-turned flanges 10 and 11 at its ends and in the construction of the main flume passage 4, flanges of adjacent side plates 8 and 9 are spaced slightly apart by spacers 12, the adjacent side plates 8 and 9 being fastened together by rivets or bolts 13 or other suitable means. Between each of the abutting side plates 8 or 9, there is thus formed a vertical groove which serves to support and guide the baffles 14 forming the sand collection pockets. Inasmuch as such baffles are all of similar construction, only one of the same will be described.

Between adjacent side plates 8 and 9 are secured vertical plates 14ª which extend below the bottom of the flume passage and serve as legs or supports for the passage 4. The baffles 14 are indicated as formed in two relatively movable sections 15 and 16, of which the section 15 is the lower section. Each of said sections are substantially equal in width to the width of the flume passage and are provided at their tops with horizontal flanges 17 and 18, by which they may be handled. The lower section 15 of the baffles rests upon the bottom of the flume passage and the upper section 16 of the baffle is adjustably mounted on the section 15 in order that its height may be regulated as desired to increase or decrease the depth of the resulting sand collection pocket, thus formed. For this purpose, the baffle sections 16 are provided with a plurality of vertically spaced apart openings 19, any one of which may receive a pin or bolt 20 mounted in the baffle section 15. Preferably a pin 20 and a series of openings 19 are provided at each end of the baffle. By selection of the opening 19 through which the pin 20 passes, the height of the combined baffle is thus determined. Preferably the baffle section 15 has its sides flanged, as indicated at 21, and such flanges are secured to channels 22, which have one of their sides within the grooves in the side plates 14$^a$ for guidably supporting the baffles. Such channels extend upwardly above the top of the flume and there connect with a cross member 23 which serves as a handle for installing and removing the baffles from the flume.

At the end of the flume passage 4, a gate 26 is provided which may be of any suitable or desired construction. Said gate is indicated as being formed by an opening 27 in the end wall of the passage 14 and with a slidable plate 28 placed against the inner side of said wall and normally covering the opening 27, brackets 29 holding the plate 28 in position.

In operation, the mud fluid with its entrained sand and detritus is continually passed from the well through the passage or conduit 3 into the flume passage 4. Here the sand or detritus of such fluid continually settles out and is collected in the pockets formed by the baffles 4, the colloidally suspended mud remaining in the fluid and passing through the passage 5 into the holder 6. In this way, a small amount of flushing fluid may be continually used and reused in the drilling of the well and the sand effectually removed therefrom. The adjustable baffles 14 provide a means by which the size of the sand collection or separating pockets may be varied, as required by the changes and character of the drilling action and quantity of mud fluid and percentage of detritus passing from the well. Whenever necessary, the baffles 14 may be readily removed from the flume passage and the flushing gate 26 opened and the sand and detritus separated and collected in such passage readily flushed out.

While the mud flume or apparatus herein described is well adapted for carrying out the objects of the present invention, it is to be understood that various modifications and changes may be made in the details or arrangement of parts without departing from the present invention and the present invention includes all such modifications and changes as come within the scope of the following appended claims.

I claim:

1. A mud flume of the class described, comprising a separating conduit having a horizontal bottom, said conduit providing side plates with outturned flanges, spacers between said flanges and means for attaching the flanges together whereby the flanges form vertical grooves at the side of said conduit, and baffles slidable in said grooves and formed of upper and lower baffle plates relatively movable.

2. A mud flume of the class described, comprising a flume passage having a horizontal bottom, said flume passage having side plates with outturned flanges and vertical plates clamped between said flanges and providing supporting means for the flume passage, and baffles in said conduit for forming sand collection pockets, said baffles being removable therefrom, each baffle being formed into relatively movable baffle plates operative for varying the depth of the sand collection pockets.

3. A flume passage, comprising a horizontal bottom wall, side plates connected to said bottom wall and having outturned flanges, vertical plates clamped between said flanges and open so as to leave substantially unobstructed the flume passage, said vertical plates extending below the flume passage to provide for supporting the same, and baffle plates in said flume passage providing sand collection pockets.

Signed at Los Angeles, California, this 4 day of April, 1927.

ALVAH M. GRIFFIN.